US006452588B2

(12) United States Patent
Griffin et al.

(10) Patent No.: US 6,452,588 B2
(45) Date of Patent: *Sep. 17, 2002

(54) HAND-HELD E-MAIL DEVICE

(75) Inventors: Jason T. Griffin; John A. Holmes; Mihal Lazaridis; Herb A. Little; Harry R. Major, all of Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/900,585

(22) Filed: Jul. 6, 2001

Related U.S. Application Data

(63) Continuation of application No. 09/106,585, filed on Jun. 29, 1998, now Pat. No. 6,278,442, which is a continuation-in-part of application No. 29/089,942, filed on Jun. 26, 1998, now Pat. No. Des. 416,256.

(51) Int. Cl.[7] .................................................. G09G 5/00
(52) U.S. Cl. ......................... 345/169; 345/168; 400/489
(58) Field of Search ................................ 345/156, 168, 345/169, 146, 160, 170, 171, 158; 400/489, 472, 486, 479; 341/20–23

(56) References Cited

U.S. PATENT DOCUMENTS

D278,341 S    4/1985  Scheid

D293,241 S    12/1987  Wan et al.

(List continued on next page.)

FOREIGN PATENT DOCUMENTS

| EP | 0760291 | 3/1997 |
| WO | 9937025 | 7/1999 |
| WO | 0030381 | 5/2000 |

OTHER PUBLICATIONS

"Programmable Calculators: Hewlett–Packard HP–200LX," Viktor T. Toth, copyr. 2001, 2002, from web page at www.r-skey.org/hp2001x.htm.

*Primary Examiner*—Bipin Shalwala
*Assistant Examiner*—Mansour M. Said
(74) *Attorney, Agent, or Firm*—Jones, Day, Reavis & Pogue; Krishan K. Pathiyal, Esq.; Charles B. Meyer, Esq.

(57) ABSTRACT

A hand-held electronic device with a keyboard optimized for use with the thumbs is disclosed. In order to operate within the limited space available on a hand-held electronic device, the present invention optimizes the placement and shape of the keys, preferably using keys that are oval or oblong in shape, and that are placed at angles designed to facilitate thumb-typing. The angles at which keys on either side of the keyboard are placed is complimentary.

47 Claims, 4 Drawing Sheets

U.S. PATENT DOCUMENTS

| | | |
|---|---|---|
| D313,413 S | 1/1991 | Langton |
| 5,184,830 A | 2/1993 | Okada et al. |
| 5,217,295 A | 6/1993 | Tortola et al. |
| 5,367,298 A | 11/1994 | Axhelm |
| D357,253 S | 4/1995 | Wong |
| 5,410,141 A | 4/1995 | Koenck et al. |
| 5,426,449 A | 6/1995 | Danziger |
| 5,436,954 A | 7/1995 | Nishiyama et al. |
| 5,457,454 A | 10/1995 | Sugano |
| 5,500,643 A | 3/1996 | Grant |
| 5,606,712 A | 2/1997 | Hidaka |
| 5,611,031 A | 3/1997 | Hertzfeld et al. |
| D383,756 S | 9/1997 | Henderson et al. |
| 5,672,108 A | 9/1997 | Lam et al. |
| D386,497 S | 11/1997 | Huslig et al. |
| 5,737,394 A | 4/1998 | Anderson et al. |
| D397,369 S | 8/1998 | Rissman |
| D397,728 S | 9/1998 | Yuen et al. |
| D399,537 S | 10/1998 | Chi et al. |
| 5,818,437 A | 10/1998 | Grover et al. |
| 5,825,353 A | 10/1998 | Will |
| D403,362 S | 12/1998 | Fai |
| 5,893,798 A | 4/1999 | Stambolic et al. |
| 5,915,228 A | 6/1999 | Kunihiro et al. |
| 5,920,308 A | 7/1999 | Kim |
| 5,931,873 A | 8/1999 | Cisar |
| 5,963,197 A | 10/1999 | Bacon et al. |
| 5,974,238 A | 10/1999 | Chase, Jr. |
| 5,982,520 A | 11/1999 | Weiser et al. |
| 5,995,026 A | 11/1999 | Sellers |
| 6,006,351 A | 12/1999 | Peretz et al. |
| 6,014,429 A | 1/2000 | LaPorta et al. |
| 6,023,779 A | 2/2000 | Fullam et al. |
| 6,047,047 A | 4/2000 | Aldridge et al. |
| 6,052,070 A | 4/2000 | Kivela et al. |
| 6,094,197 A | 7/2000 | Buxton et al. |
| 6,102,594 A | 8/2000 | Strom |
| 6,103,979 A | 8/2000 | Motoyama et al. |
| 6,107,997 A | 8/2000 | Ure |
| 6,148,261 A | 11/2000 | Obradovich et al. |
| 6,157,323 A | 12/2000 | Tso et al. |
| 6,212,412 B1 | 4/2001 | Rogers et al. |
| 6,243,789 B1 | 6/2001 | Hasbun et al. |
| 6,297,795 B1 | 10/2001 | Kato et al. |

HAND-HELD E-MAIL DEVICE

CROSS-REFERENCE TO RELATED APPLICATIONS

This application is a continuation of U.S. patent application Ser. No. 09/106,585, filed on Jun. 29, 1998 U.S. Pat. No. 6,278,442, which is a continuation-in-part of U.S. Design Application Ser. No. 29/089,942, entitled Hand-held Messaging Device with Keyboard, filed on Jun. 26, 1998 U.S. Pat. No. 416,256 and assigned to the assignee of the present invention.

BACKGROUND OF THE INVENTION

The present invention is directed toward the field of small, hand-held electronic devices such as personal data assistants (PDA's), personal information managers (PIM's), two-way pagers and the like. In particular, the system and method of the present invention provide the user of the hand-held device with the ability to input data with a minimal amount of key strokes and optimized for use substantially with the thumbs.

In a two-way paging system that provides two-way, full text messaging, there is a need to permit the user to initiate messages and to respond to messages in a timely fashion and with text entirely created by the user. In order to keep the form factor of the two-way pager small enough to be worn on the body of the user, such as with a belt clip, the input device needs to be small, have a minimal number of keys and optimized for use with a minimal number of key strokes. Prior art systems have attempted to address these needs by incorporating virtual keyboards or pen-based input systems for user inputs to the device, but such systems require the user to input data in an unfamiliar manner. Additionally, in a small hand-held messaging device, such as a two-way pager these systems prove awkward to use.

In order to provide a hand-held electronic device that permits a user the opportunity to enter data into an address book, a calendar, a task list, an email message or a similar text file that requires user-generated data, the instant invention is directed to an input device that is oriented to be used substantially through use of the thumbs. This is accomplished first by providing a keyboard with a minimal number of keys, but with the keys representing the alphabet generally placed in the same order as they would appear on a standard keyboard, such as in a standard QWERTY or a DVORAK keyboard layout. The use of a keyboard layout that is familiar to the user enables the user to immediately use the device without having to hunt for the keys he or she wishes to use.

Although the layout is similar to a standard keyboard, the keys are placed at an orientation and in a particular shape that attempts to maximize the surface area of the thumb hitting the key and to provide the user with a comfortable position of the hands for data input. Also, the orientation encourages input by the thumbs, which the inventors of the instant invention have discovered to be faster and more accurate in small hand-held electronic devices than touch-typing or "hunting and pecking" typing.

An additional feature of the invention is thus use of an additional input means for control of functions that might otherwise be controlled by a keyboard that included function keys. To encourage data entry using thumbs and again to minimize the number of keys on the keyboard, the instant invention also includes a thumb-wheel for control of menus for section of forms and functions relevant to data input. The thumb-wheel is positioned in close proximity to the keyboard to enable the easily transition from thumb-based typing to thumb control of forms and functions.

In addition to hardware features that encourage optimal data entry through the use of thumbs, there are several software features that are designed to minimize keystrokes and aid in entry of data.

The features of this invention, both individually and collectively, have not, to the knowledge of the inventors, been applied to a small hand-held electronic device that requires user-generated data entry. To permit efficient operation of such devices while keeping the form factor of the device small enough to be worn on the body, there is a general need for a hand-held electronic device that can fit in the palm of the hand and that can be operated substantially with the thumbs.

There is a further need for a keyboard for a palm-size data entry device with keys placed at an angle to optimize operation of the keyboard by the use of the thumbs.

There remains another need for a keyboard with keys that are shaped and sized to maximize contact with the thumbs while minimizing the keyboard area required for such keys.

There also remains a need for an auxiliary input device that is to be operated by the thumb for data inputs forms and function control and that, in conjunction with the keyboard, encourages and permits data entry and management through input performed substantially by the thumbs.

There remains still another need for a software-implemented user interface system that is designed, at least in part, to support and encourage data entry through use of the thumbs.

SUMMARY OF THE INVENTION

The present invention overcomes the problems noted above and satisfies the needs in this field for a hand-held electronic device with a keyboard optimized for use with the thumbs. In the preferred embodiment of the present invention, the hand-held electronic device is a two-way paging device that permits full-text, two-way messaging such as email messaging and that includes standard PDA or PIM features such as an address book, an electronic calendar, a task list and other text-based features. These features require user input of text strings that can be lengthy and that cannot be reduced to predetermined or "canned" strings. Thus, for such a device, the efficient entry of data in a device meant to fit into the palm of one's hand requires that two goals are achieved. First, the data entry must be relatively easy from a user perspective. This means that the user must be somewhat familiar with analogous forms of data entry and not have to be trained to use the data entry for the hand-held device. Second, the form factor does not permit a large number of keys or keys that are very large. Thus efficient use of the keyboard space is required and functions that might be able to be performed by a standard keyboard are off-loaded to an auxiliary input device or are performed, through a minimal number of keystrokes that encourage the use of thumb-based data entry.

To accomplish these goals the invention first optimizes the placement of the keys on the device keyboard. In order to work within the limited space available for the keyboard, it was determined that it was preferable to use keys that were oval or oblong and that were placed at angles designed to facilitate use by thumb typing. An angle for the keys on the right side of the keyboard and a complementary angle for the keys on the left side of the keyboard are chosen based upon observation of the angle at which a user will orient his or her thumbs while thumb-typing.

The invention also minimizes the number of keys available for data input. In the preferred embodiment, only keys for the 26 letters of the English alphabet are available as well as a backspace key, a line feed key, an "alt" key, a "cap" key and a space bar. The alt key enables the user in conjunction the other keys to input numbers and symbols to perform certain functions. The placement of the keys is designed to enhance the user experience while typing with the thumbs by meeting two seemingly opposite goals—minimizing the keyboard footprint while maximizing the likelihood that proper keys will be struck by the thumb-typing user.

The invention also provides additional incentive for the user to use thumb input by providing an input device adjacent to the keyboard, but integral to the overall handheld device. Although other devices can be used in an auxiliary fashion, the preferred device is a thumbwheel that registers movement of the wheel by measuring the number of indents traversed while rolling the wheel and that also registers as an input the depression or "clicking" of the wheel, which is performed by pressing the wheel toward the back of the pager. This clicking of the wheel is similar to the clicking of a mouse associated with a PC or any other input device that registers the depression of a button. The thumbwheel in the preferred embodiment is placed vertically on the two-way paging device so that the user can easily move his or her thumb from the thumbwheel to the keyboard and back for performing functions and retrieving data forms, such as an e-mail template or address book entry template for data entry.

Additionally, various software techniques can be implemented to enhance the thumbtyping use's experience in using the device of the instant invention. In the preferred embodiment, for example, the user can change the capitalization of a particular letter simply by keeping a key depressed for a particular length of time without an intermittent release being detected by the keyboard controller.

The primary advantage of the present invention is that it enables efficient and user-friendly data entry into a palm-sized electronic device by maximizing the potential for user data entry through thumb typing.

These are just a few of the many advantages of the present invention, as described in more detail below. As will be appreciated, the invention is capable of other and different embodiments and its several details are capable of modifications in various respects, all without departing from the spirit of the invention. Accordingly, the drawings and description of the preferred embodiment set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION

Figure 1:
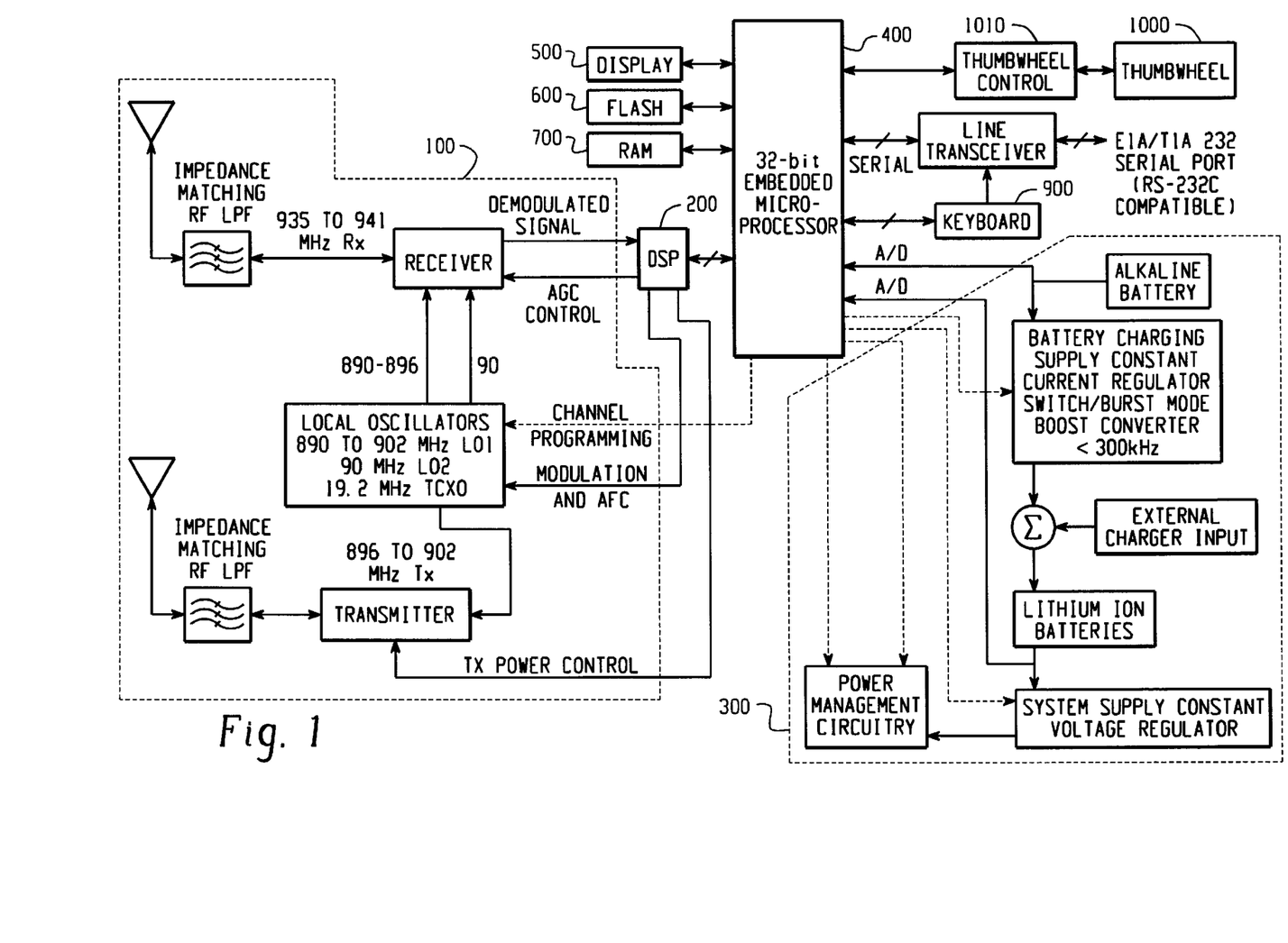
FIG. 1 is a block diagram of a two-way, full-text, messaging device incorporating a keyboard and an auxiliary data entry device.

Referring now to the drawings, FIG. 1 is a block diagram of the major subsystems and elements comprising a palm-sized, mobile, two-way messaging device that preferably incorporates the invention. In its broadest terms, the messaging device includes a transmitter/receiver subsystem 100 connected to a DSP 200 for digital signal processing of the incoming and outgoing data transmissions, power supply and management subsystem 300, which supplies and manages power to the overall messaging device components, microprocessor 400, which is preferably an X86 architecture processor, that controls the operation of the messaging device, display 500, which is preferably a full graphic LCD, FLASH memory 600, RAM 700, serial output and port 800, keyboard 900, thumbwheel 1000 and thumbwheel control logic 1010. In its intended use, a message comes via a wireless data network, such as the Mobitex network, into subsystem 100, where it is demodulated via DSP 200 and decoded and presented to microprocessor 300 for display on display 500. To access the display of the message, the user may choose from functions listed under a menu presented as a result of user interaction with thumbwheel 1000. If the message is an email message, the user may chose to respond to the email by selecting "Reply" from a menu presented on the display through interaction via thumbwheel 1000 or via menu selection from keyboard 900. In typing the reply, the user can use keyboard 900 to type full text message replies, or insert pre-determined or "canned" response by using either a particular keystroke pattern or through pulling down predetermined text strings from a menu of items presented on display 500 through the use of thumbwheel 1000. When the reply to the message is composed the user can initiate the sending of the message preferably by interaction through thumbwheel 1000, or alternatively, with less efficiency, through a combination of keyboard 900 keystrokes. When the microprocessor 300 receives an indication that the message is to be sent, it processes the message for transport and, by directing and communicating with transmitter/receiver subsystem 100, enables the reply message to be sent via the wireless communications data network to the intended recipient. Similar interaction through I/O devices keyboard 900 and thumbwheel 1000 can be used to initiate full-text messages or to forward messages to another party. Also, the keyboard 900 and thumbwheel 1000 can be used to permit data entry to an address book resident on the messaging device, or an electronic calendar or log book, or any other function on the messaging device requiring data entry. Preferably, the thumbwheel is a thumbwheel with a push button SPST with quadrature signal outputs, such as that manufactured by Matsushita Electronic Components Co. Ltd. as part number EVQWK2001.

Figure 2:
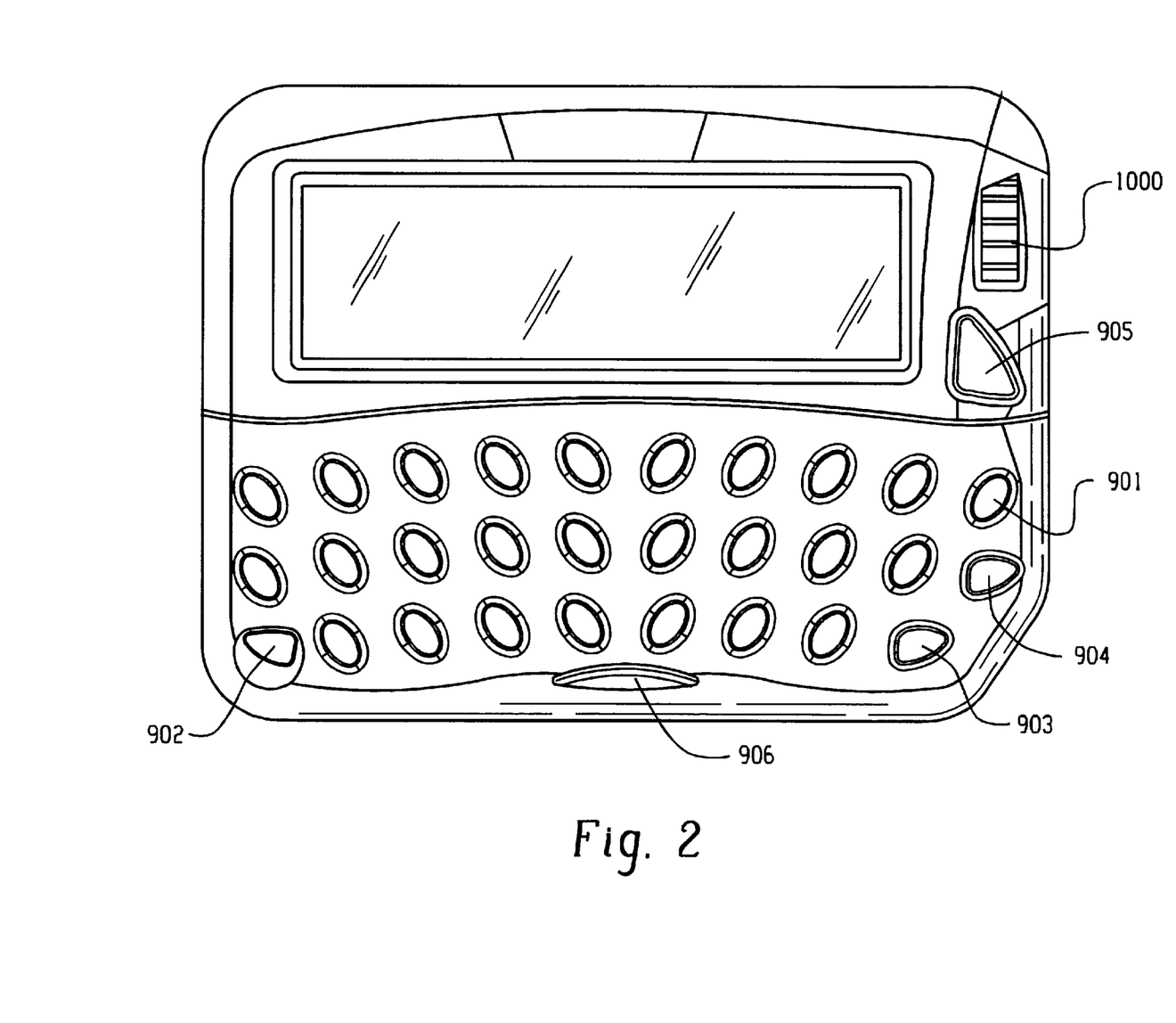
FIG. 2 is a frontal view of the hand-held device showing the shape and placement of the keys on the keyboard and the auxiliary input device.

FIG. 2 is a front view of messaging device 10 that incorporates the invention. Shown in FIG. 2 are a plurality of letter keys 901, and specialized keys 902, 903, 904 and 905 and space bar 906. Also shown is thumbwheel 1000 in its vertical orientation and in association with display 500 and keyboard 900. In the preferred embodiment, 902 is the alt key, 903 is the cap key. 904 is the line feed key and 905 is the backspace key.

Figure 3:
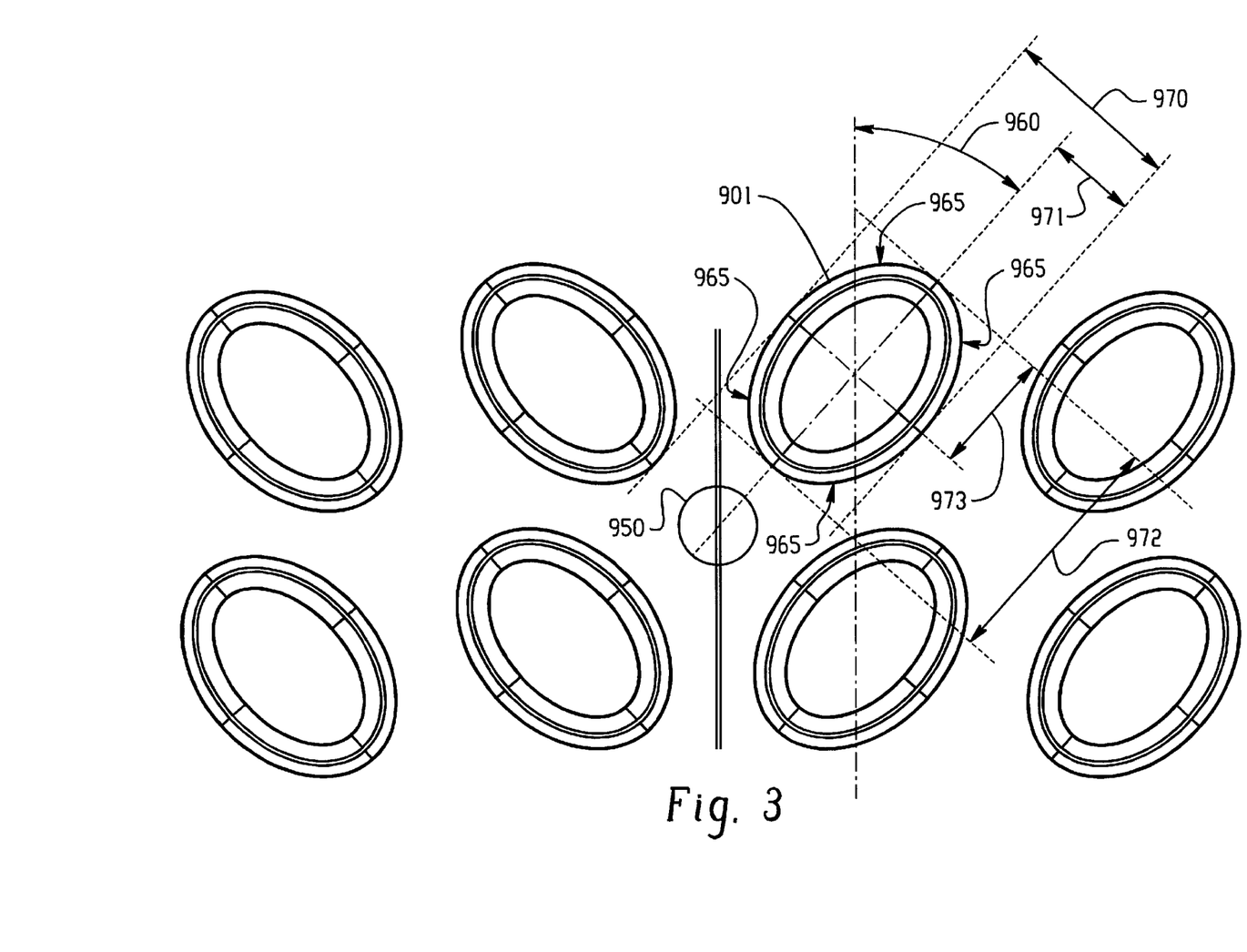
FIG. 3 is a diagram of showing the shape size and placement of the keys on the keyboard.

FIG. 3 is a view of a subset of the letter keys 901, showing the dimensions and relative position of the keys. Shown also is the point 950 that marks the center of keyboard 900, key dimensions 970, 971, 972 and 973, as well as angle 960 and the rho value 965, representing curvature of a letter key 901. In investigating optimal key placement on the keyboard, it was determined that the keys should be placed at an angle 960 relative to vertical that facilitated easy typing using thumbs. That angle is preferably positive 40 degrees relative to vertical for keys on the right side of the keyboard (where 950 is the center of the keyboard) and negative 40 degrees for the keys on the left side of the keyboard, although complementary angles ranging from 20 degrees to 70 degrees could also be used to accomplish the goal, albeit less optimally, of facilitating thumb typing. Also as shown on FIGS. 2 and 3, the keys are dispersed across keyboard 900 evenly so that there is sufficient space between the keys to decrease the opportunity for multiple keys being depressed while thumb typing. Additionally, the keys are sized appropriate given the footprint of the messaging device and the keyboard 900. In its preferred embodiment, the messaging device 10 measures across its face 64 mm by 89 mm, which does not leave much room for keyboard 900 and display 500. In the preferred embodiment, keyboard 900 occupies over half of the face of the messaging device 10.

The key shape and dimensions are also key components of the invention. In order to maximize the surface area of the key that a thumb would hit, the keys are preferably oval, and have a rho 965 defining the curvature of the key of 0.4 14, although values may range higher or lower. Other rho values will lead to an acceptable, but not as optimal or aesthetically pleasing shape of keys 901. As to the key dimensions, the width 970 of the key 901 is 4.8 millimeters (971 representing the radius of half that value, 2.4 mm) and the length (or height) 972 of the key 901 is 7 millimeters millimeters (973 representing the radius of half that value, 3.5 mm).

Turning to one of the software features that aids in the device 10 being optimally used for thumb typing is a capitalization feature implemented via software. If a user depresses a key 901, the operating system detects a key down event. If the key is released after a period of time, the operating system detects a key up event. If upon a key down event, a period of time elapses before a key up event is detected, the operating system determines that a key repeat event has occurred representing a situation where a user has continued to depress a key without releasing it. A key repeat event is then treated by application software residing in either FLASH 600 or RAM 700 as an event that requires the capitalization of the key previously depressed. This feature disables a key repeat feature and substitutes instead a capitalization feature based upon a key repeat. The timing of the key scanning to determine whether a key has been released can be set to permit a slower keyboard response or a faster keyboard response, depending upon user experience or preferences. Although the capitalization function preferably works only to change the state of a letter to a capital, it alternatively could operate to change a capital letter to a lower case letter. The actual display is changed by the application program substituting the value of the capital letter in the register that holds the value of the letter to be displayed. As alternatively implemented, the continued depressing without release of a letter key could result in a key oscillating between upper case and lower case, depending on the length of time the key is depressed.

Figure 4:
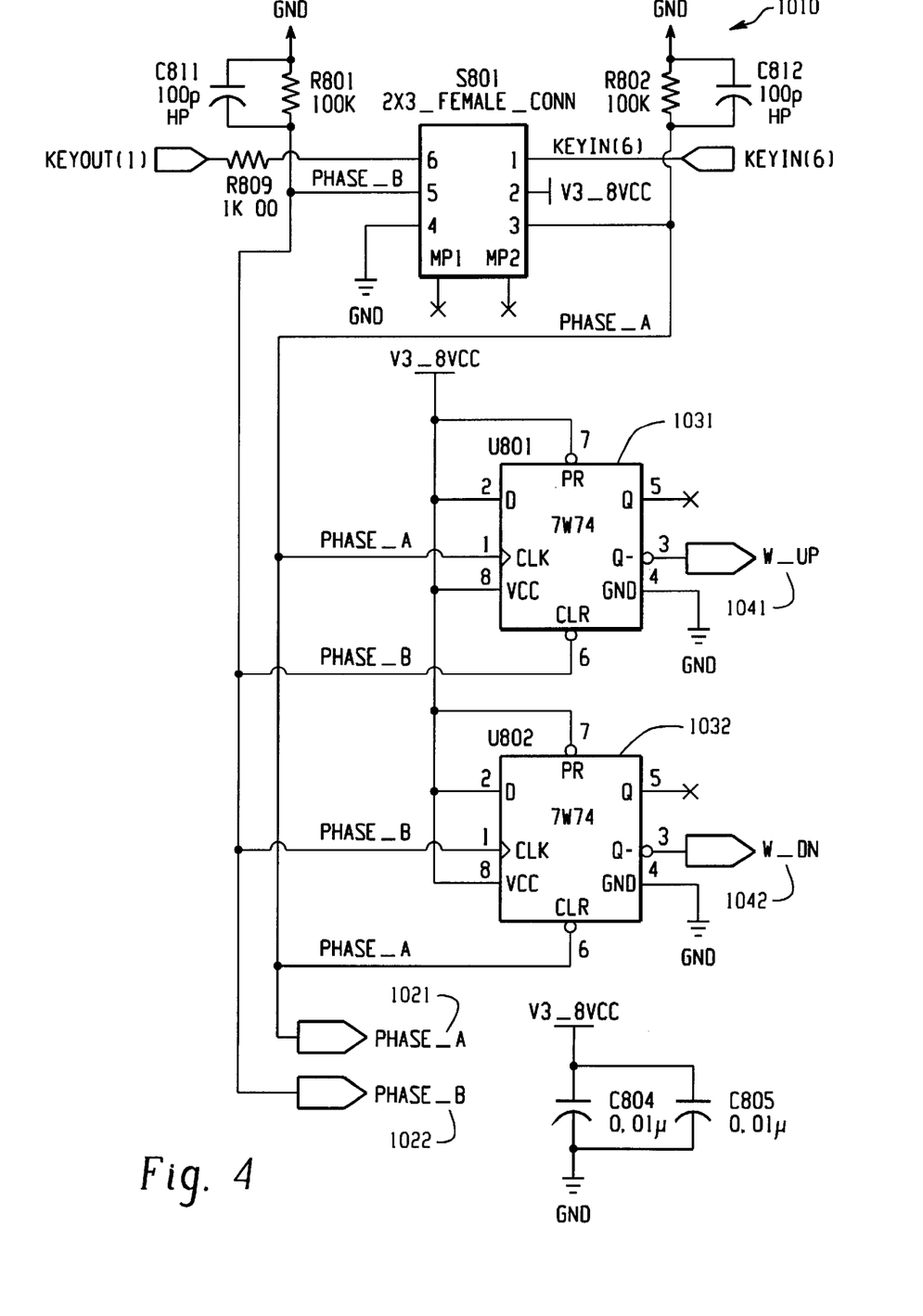
FIG. 4 is a diagram of the control circuitry for the thumbwheel.

FIG. 4 is the logic circuitry 1010 associated with thumbwheel 1000. Thumbwheel 1000 outputs quadrature signals phase A 1021 and phase B 1022, which are processed by D flip-flops 1031 and 1032 to present signals 1041 W_UP and 1042 W_DN to microprocessor 300. Signals 1041 and 1042 represent, respectively, a user rolling the thumbwheel up and rolling the thumbwheel down.

Having described in detail the preferred embodiments of the present invention, including the preferred methods of operation, it is to be understood that this operation could be carried out with different elements and steps. This preferred embodiment is presented only by way of example and is not meant to limit the scope of the present invention which is defined by the following claims.

What is claimed is:

1. A handheld e-mail device optimally configured for use with the thumbs of a user, comprising:
    a QWERTY keyboard comprising a plurality of letter keys, wherein the plurality of letter keys are oblong shaped keys, and wherein each oblong shaped key is tilted at a common angle relative to a vertical reference through the device, wherein the plurality of letter keys in the QWERTY keyboard are grouped into a first set of letter keys and a second set of letter keys, wherein the common angle for the first set of letter keys is a positive angle with respect to the vertical reference and the common angle for the second set of letter keys is a negative angle with respect to the vertical reference;
    an auxiliary input device positioned in relative proximity to the QWERTY keyboard;
    a display positioned adjacent to the keyboard;
    a transceiver for sending and receiving e-mail messages to and from a wireless network; and
    software residing in the device for providing functionality to inputs received from the auxiliary input device and the QWERTY keyboard.

2. The handheld e-mail device of claim 1, wherein the plurality of oblong shaped letter keys are oval shaped.

3. The handheld e-mail device of claim 1, wherein the positive angle is about 40 degrees and the negative angle is about 40 degrees.

4. The handheld e-mail device of claim 1, wherein a rho value defining the curvature of the first and second set of oblong shaped keys is about 0.414.

5. The handheld e-mail device of claim 1, wherein the auxiliary input device is a thumbwheel.

6. The handheld e-mail device of claim 5, wherein the thumbwheel is vertically oriented.

7. The handheld e-mail device of claim 1, wherein the device is a two-way pager.

8. The handheld e-mail device of claim 1, wherein the device is a personal digital assistant.

9. The handheld e-mail device of claim 1, wherein the plurality of letter keys are grouped into three rows of letter keys, each row of letter keys positioned on the device along an arc.

10. The handheld e-mail device of claim 9, wherein the arcs are concentric.

11. A handheld e-mail device optimally configured for use with the thumbs of a user comprising:
    (a) a device housing;
    (b) a QWERTY keyboard residing on the housing, the QWERTY keyboard having a plurality of oblong shaped letter keys, wherein each oblong shaped letter key is tilted at a common angle relative to a vertical reference through the device, and wherein the QWERTY keyboard is used to generate an e-mail message, wherein the plurality of letter keys include two groups of keys, a first group of letter keys that are tilted at a positive angle with respect to the vertical reference and a second group of letter keys that are tilted at a negative angle with respect to the vertical reference, wherein the positive and negative angles are common in magnitude but opposite in sign; and
    a transceiver for sending and receiving e-mail messages to and from a wireless network.

12. The handheld e-mail device of claim 11, wherein the plurality of oblong shaped letter keys are oval shaped.

13. The handheld e-mail device of claim 12, wherein a rho value defining the curvature of the oblong shaped keys is about 0.4.

14. The handheld email device of claim 11, wherein the plurality of letter keys are grouped into three rows of letter keys, a first row, a second row, and a third row, wherein the first, second and third rows of letter keys are positioned on the device housing along first, second and third arcs.

15. The handheld e-mail device of claim 14, wherein the first, second and third arcs are concentric.

16. The handheld e-mail device of claim 11, wherein the handheld e-mail device is a two-way pager, a cellular telephone, a portable digital assistant, or an electronic organizer.

17. An electronic communication device, comprising:

a transceiver for transmitting and receiving text messages to and from a wireless network;

a keyboard for composing text messages to be transmitted by the transceiver, wherein the keyboard includes three sets of oblong shaped keys, wherein the three sets of oblong shaped keys are arranged into a QWERTY keyboard having three rows of keys, a top row, a middle row, and a bottom row, wherein the first set of keys is arranged in an arc and forms a top row of keys in the QWERTY keyboard, the second set of keys is arranged in an arc and forms a middle row of keys in the QWERTY keyboard, and the third set of keys is arranged in an arc and forms the bottom row of keys in the QWERTY keyboard, wherein the three sets of oblong shaped keys are oval shaped, and wherein the oval shaped keys are tilted at a common angle with respect to a vertical reference through the electronic communication device; and a display for displaying the received text messages.

18. The electronic communication device of claim 17, further comprising:

an auxiliary input device for selecting an operation to be performed by the device, wherein a menu of operations is presented on the display.

19. The electronic communication device of claim 17, wherein the text messages are e-mail messages.

20. The electronic communication device of claim 17, wherein the transceiver includes:

a first antenna for receiving a text message; and a second antenna for transmitting a text message.

21. The electronic communication device of claim 20, wherein the transceiver further includes:

a receiver, coupled to the first antenna, for demodulating the received text message; and a transmitter, coupled to the second antenna, for generating a modulated text message.

22. The electronic communication device of claim 21, wherein the transceiver further includes:

a digital signal processor coupled to the transmitter and the receiver for processing demodulated text messages from the receiver, and for providing modulation information to the transmitter.

23. A handheld e-mail device, comprising:

a transceiver for transmitting and receiving e-mail messages to and from a wireless network;

a keyboard for composing email messages to be transmitted by the transceiver, wherein the keyboard includes three sets of tilted keys, wherein the three sets of tilted keys are arranged into a QWERTY keyboard having at least three rows of keys, a top row, a middle row, and a bottom row, wherein the first set of keys is tilted at a first angle to a vertical reference and forms a top row of keys in the QWERTY keyboard, the second set of keys is tilted to a second angle to the vertical reference and forms a middle row of keys in the QWERTY keyboard, and the third set of keys is tilted to a third angle to the vertical reference and forms the bottom row of keys in the QWERTY keyboard, wherein the first, second and third angles are equal; and a display for displaying the received e-mail messages.

24. A handheld e-mail device optimally configured for use with the thumbs of a user, comprising:

a device housing;

a QWERTY keyboard comprising a plurality of letter keys, wherein the plurality of letter keys are oblong shaped keys, and wherein each oblong shaped key is tilted relative to a vertical reference through the device, wherein the plurality of letter keys in the QWERTY keyboard are grouped into a first set of letter keys and a second set of letter keys, wherein the first set of letter keys are tilted at a positive angle with respect to the vertical reference and the second set of letter keys are tilted at a negative angle with respect to the vertical reference;

an auxiliary input device positioned in relative proximity to the QWERTY keyboard;

a display positioned adjacent to the keyboard;

a transmitter and a receiver for transmitting and receiving e-mail messages to and from a wireless network; and software residing in the device for providing functionality to inputs received from the auxiliary input device and the QWERTY keyboard.

25. The handhold e-mail device of claim 24, wherein the plurality of oblong shaped letter keys are oval shaped.

26. The handhold e-mail device of claim 24, wherein the auxiliary input device is a thumbwheel.

27. The handheld e-mail device of claim 24, wherein the auxiliary input device includes a directional input component for navigating a plurality of menu items presented on the display and a selector switch for selecting a menu item from the plurality of menu items.

28. The handheld e-mail device of claim 24, wherein the device is a two-way pager.

29. The hand held e-mail device of claim 24, wherein the device is a personal digital assistant.

30. The hsndheld e-mail device of claim 24, wherein the plurality of letter keys are grouped into three rows of letter keys, each row of letter keys positioned on the device along an arc.

31. The handheld e-mail device of claim 30, wherein the arcs are concentric.

32. The handheld e-mail device of claim 23, further comprising:

a microprocessor; and a memory for storing the software, the software including an operating system and a plurality of application programs that are executed by the microprocessor to control the operation of the handheld device.

33. The handhold e-mail device of claim 32, wherein the memory is a flash memory.

34. The handheld e-mail device of claim 32, further comprising a digital signal processor coupled between the microprocessor and the transmitter and the receiver included in the handheld device.

35. The handheld e-mail device of claim 32, wherein the plurality of application programs include a messaging application for generating e-mail messages and a calendar application.

36. The handheld e-mail device of claim 35, wherein the plurality of application programs further include an address book application.

37. The handheld e-mail device of claim 24, further comprising a serial port for coupling the handheld e-mail device to a host computer.

38. The handheld e-mail device of claim 24, further comprising a power supply subsystem including a rechargeable battery and an external charger input for receiving a source of electrical charge to recharge the rechargeable battery.

39. The handheld e-mail device of claim 38, wherein the rechargeable battery is a lithium ion battery.

40. The handheld e-mail device of claim 38, wherein the power supply subsystem further includes a voltage regulator coupled to the rechargeable battery for generating a regulated supply voltage for powering the device.

41. The handheld e-mail device of claim 38, wherein the power supply subsystem further includes connections to a microprocessor for monitoring the operation of the power supply subsystem.

42. An electronic communication device, comprising:

a device housing;

a transceiver for transmitting and receiving text messages;

a keyboard for composing text messages to be transmitted by the transceiver, wherein the keyboard includes three sets of tilted oblong shaped keys, wherein the three sets of tilted oblong shaped keys are arranged into a QWERTY keyboard having three rows of keys, a top row, a middle row, and a bottom row, wherein the first set of keys is arranged in an are and forms a top row of keys in the QWERTY keyboard, the second set of keys is arranged in an arc and forms a middle row of keys in the QWERTY keyboard, and the third set of keys is arranged in an arc and forms the bottom row of keys in the QWERTY keyboard, wherein the three sets of tilted oblong shaped keys are oval shaped, and wherein the oval shaped keys are tilted at a common angle with respect to a vertical reference through the electronic communication device.

43. The electronic communication device of claim 42, further comprising:

an auxiliary input device for selecting an operation to be performed by the device, wherein a menu of operations is presented on the display.

44. The electronic communication device of claim 42, wherein the text messages are email messages.

45. The electronic communication device of claim 42, wherein the transceiver includes:

a first antenna for receiving a text message; and a second antenna for transmitting a text message.

46. The electronic communication device of claim 45, wherein the transceiver further includes:

a receiver, coupled to the first antenna, for demodulating the received text message; and a transmitter, coupled to the second antenna, for generating a modulated text message.

47. The electronic communication device of claim 46, wherein the transceiver further includes:

a digital signal processor coupled to the transmitter and the receiver for processing demodulated text messages from the receiver, and for providing modulation information to the transmitter.

* * * * *

UNITED STATES PATENT AND TRADEMARK OFFICE
CERTIFICATE OF CORRECTION

PATENT NO.    : 6,452,588 B2
DATED         : September 17, 2002
INVENTOR(S)   : Jason T. Griffin et al.

It is certified that error appears in the above-identified patent and that said Letters Patent is hereby corrected as shown below:

<u>Title page,</u>
Item [74], please replace "Krishan" with -- Krishna --

<u>Column 1,</u>
Line 10, please replace "416,256" with -- D416,256 --

<u>Column 7,</u>
Line 60, please replace "email" with -- e-mail --

<u>Column 8,</u>
Line 29, 31, 40, and 55, please replace "handhold" with -- handheld --
Line 42, please replace "hsndhold" with -- handheld --
Line 48, please replace "23" with -- 24 --

<u>Column 9,</u>
Line 29, please replace "are" with -- arc --

<u>Column 10,</u>
Line 13, please replace "email" with -- e-mail --

Signed and Sealed this

Nineteenth Day of August, 2003

JAMES E. ROGAN
*Director of the United States Patent and Trademark Office*